Nov. 11, 1947.            G. H. AKLIN                2,430,548
                    CAMERA OBJECTIVE LENSES
                      Filed Aug. 10, 1944
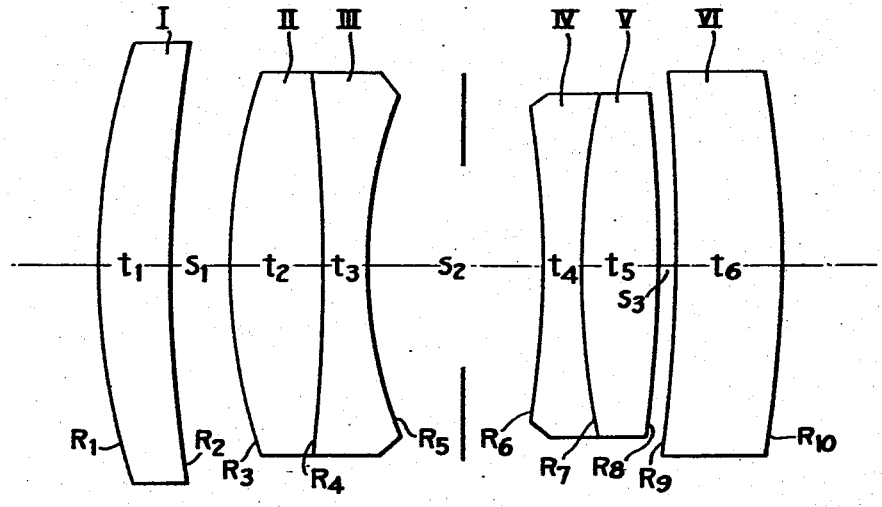
| EF = 100 mm. | | | | f/4.0 |
|---|---|---|---|---|
| LENS | N | V | RADII | THICKNESSES |
| I | 1.804 | 41.6 | $R_1 = +\ 34.0$ mm. | $t_1 = 3.28$ mm. |
|   |       |      | $R_2 = +\ 65.1$     | $S_1 = 2.79$ |
| II | 1.498 | 67.0 | $R_3 = +\ 27.0$    | $t_2 = 4.35$ |
| III | 1.617 | 38.5 | $R_4 = -143.4$    | $t_3 = 2.14$ |
|   |       |      | $R_5 = +\ 19.9$     | $S_2 = 8.20$ |
| IV | 1.541 | 47.5 | $R_6 = -\ 43.4$    | $t_4 = 1.81$ |
| V | 1.734 | 51.1 | $R_7 = +\ 41.0$     | $t_5 = 3.61$ |
|   |       |      | $R_8 = -\ 62.7$     | $S_3 = 0.66$ |
| VI | 1.804 | 41.6 | $R_9 = -\ 77.6$    | $t_6 = 5.09$ |
|   |       |      | $R_{10} = -\ 54.4$  | $BF = 79.0$ |
GEORGE H. AKLIN
*INVENTOR*
BY
ATTY & AGT Patented Nov. 11, 1947

2,430,548

UNITED STATES PATENT OFFICE 2,430,548

CAMERA OBJECTIVE LENSES

George H. Aklin, Rochester, N. Y., assignor to Eastman Kodak Company, Rochester, N. Y., a corporation of New Jersey Application August 10, 1944, Serial No. 548,827

13 Claims. (Cl. 88—57)

This invention relates to camera objectives.

The object of the invention is to provide a camera objective with an aperture of about f/4.0 or better covering a field of ±28° with all the usual aberration corrections and with a particularly high degree of correction of the oblique spherical aberration and coma of all orders, in other words with highly corrected rim rays.

A well known type of camera objective comprises four coaxial components separated by air of which the two outer ones are positive and the two inner ones are compound negative menisci highly concave toward each other. By highly concave is meant that the concave surface has a radius of curvature less than about half the focal length of the objective.

According to the present invention, several novel features of structure contribute to the correction of rim rays, astigmatism, and curvature of field, and when combined these features cooperate to produce a flat field with remarkably sharp definition to a degree which has heretofore been obtained only with more complex structures.

According to one feature of the invention the second component counting from the front or long conjugate side consists of a positive element with refractive index less than 1.56 and dispersive index greater than 55 cemented to the front of a negative element whose refractive index is at least 0.08 greater and whose dispersive index is at least 20 less than that of the positive element.

This relationship helps greatly in correcting the spherical aberration and flattening the field without making the rim ray aberrations appreciably worse. Usually any structure which flattens the field makes rim ray aberrations much worse.

According to a second feature of the invention, the third component consists of a positive element with refractive index greater than 1.68 and dispersive index greater than 45 cemented to the back of a biconcave element whose refractive index is at least 0.15 less than, and whose dispersive index is smaller than, that of the biconvex element. This structure is particularly beneficial to the upper rim rays, bending them down and counteracting the usual over correction of oblique spherical aberration. It also aids in correcting the Petzval sum.

When combined in one lens, these two features cooperate to correct both upper and lower rim rays.

According to a third feature of the invention the concave surface of the second component is very strong, its radius of curvature being less than 0.22F but not less than 0.14F where F is the focal length of the objective and the concave surface of the third component has a radius of curvature between 1.9 and 2.6 times as great as that of the second component.

According to a fourth feature of the invention the two outer positive components are meniscus in shape and concave toward the inner components, and the rear component is a fairly strong meniscus, the radius of curvature of its concave surface being less than twice that of its convex surface. The lower limit of this ratio (established by the fact that this is a positive component) is roughly at equality of the two radii of curvature.

The meniscus shape of the outer component aids in flattening the field at great angles of obliquity (around ±25° to 28°), and the strong meniscus shape of the rear component cooperates in a very advantageous manner with the first and second features described above to simultaneously correct the spherical aberration and field.

According to a slightly different way of describing this feature of the invention, the ratio $$\frac{P_1 + P_{10}}{P_2 + P_9}$$

lies between −2.2 and −1.0 and preferably between −2.0 and −1.4, where $P_1$ and $P_{10}$ denote the dioptric power of the convex surfaces of the outer components, and $P_2$ and $P_9$ denote the dioptric power of the concave surfaces of the outer components.

It is advantageous to combine any of the features of the present invention with those features of my Patent No. 2,343,627 issued March 7, 1944, whereby the thickness of the third component is less than 0.1F and the rear surface of the first component has a radius of curvature between 0.5F and 2.0F.

A high index positive element in one and preferably both outer components is helpful in controlling the Petzval sum and has a very beneficial effect on the primary curvature at high obliquities particularly when combined with the feature of meniscus outer components. Economy in cost of manufacture is gained by making the component consist of this one element only, but it is not necessarily so. I have found a glass with refractive index between 1.78 and 1.85 to be particularly advantageous, and it should have a dispersive index greater than 35 to aid in color correction.

The accompanying drawing shows a camera objective according to the invention.

The specifications of this objective are as follows:

EF—100m.  f/4.0

| Lens | N | V | Radii | Thicknesses |
|---|---|---|---|---|
| I | 1.804 | 41.6 | $R_1=+34.0$ mm. | $t_1=3.28$ mm. |
|   |       |      | $R_2=+65.1$     | $s_1=2.79$ |
| II | 1.498 | 67.0 | $R_3=+27.0$    | $t_2=4.35$ |
| III | 1.617 | 38.5 | $R_4=-143.4$  | $t_3=2.14$ |
|   |       |      | $R_5=+19.9$     | $s_2=8.20$ |
| IV | 1.541 | 47.5 | $R_6=-43.4$    | $t_4=1.81$ |
| V | 1.734 | 51.1 | $R_7=+41.0$     | $t_5=3.61$ |
|   |       |      | $R_8=-62.7$     | $s_3=0.66$ |
| VI | 1.804 | 41.6 | $R_9=-77.6$    | $t_6=5.09$ |
|   |       |      | $R_{10}=-54.4$  | $BF=79.0$ |

In this table the lens elements are numbered from front to rear, N is the refractive index for the D line of the spectrum, and V is the dispersive index. The radii of curvature are designated by $R_1$ to $R_{10}$ in order from front to rear and are given as $+$ or $-$ according as to whether the surface is convex or concave respectively toward the front. The thicknesses of the elements and the spaces therebetween are designated by $t$ and $s$ respectively likewise numbered from front to rear.

As is apparent from the above table of specifications, the two elements of the second component differ in refractive index by 0.119 and in dispersive index by 28.5 and the elements of the third component differ in these respects by 0.193 and 3.6. Also $R_5 \times 1.9$ is 27.8 mm. and $R_5 \times 2.6$ is 51.7; it is evident that $R_6$ lies between these two values. That is $R_6/R_5$ is between 1.9 and 2.6. The ratio $$\frac{P_1 + P_{10}}{P_2 + P_9}$$

has the value $-1.69$, which lies between $-1.4$ and $-2.0$. All the other features of the invention are even more readily apparent from the table.

I claim:

1. An objective comprising four coaxial components separated by air of which the two outer ones are positive and the two inner ones are compound negatives menisci highly concave toward each other, the objective being characterized by the concave surface of the second component counting from the front having a radius of curvature between 0.14F and 0.22F where F is the focal length of the objective and by the concave surface of the third component having a radius of curvature between 1.9 and 2.6 times that of the concave surface of the second component.

2. An objective of the type comprising four coaxial meniscus lens components separated by airspaces and concave toward the central airspace, of which the two outer ones are positive and the two inner ones, each consisting of a biconvex element cemented to a biconcave element, are negative, characterized by the biconvex element of the second component having a refractive index less than 1.56 and a dispersive index greater than 55, by the biconcave element cemented thereto having a refractive index at least 0.08 greater and a dispersive index at least 20 less than that of the biconcex element, by the concave surface of the second component having a radius of curvature between 0.14F and 0.22F where F is the focal length of the objective as a whole, and by the concave surface of the third component having a radius of curvature between 1.9 and 2.6 times that of the concave surface of the second component.

3. An objective comprising four coaxial meniscus lens components separated by airspaces and concave toward the central airspace, of which the two outer ones are positive and the two inner ones, each consisting of a biconvex element cemented to a biconcave element, are negative, characterized by the biconvex element of the third component having a refractive index greater than 1.68 and a dispersive index greater than 45, by the biconcave element cemented thereto having a refractive index at least 0.15 less than and a dispersive index smaller than that of the biconvex element, by the concave surface of the second component having a radius of curvature between 0.14F and 0.22F where F is the focal length of the objective as a whole, and by the concave surface of the third having a radius of curvature between 1.9 and 2.6 times that of the second component.

4. An objective of the type comprising four coaxial meniscus lens elements separated by airspaces and concave toward the central airspace, of which the two outer ones are positive and the two inner ones are negative, and in which the two inner concave surfaces have radii of curvature between 0.15F and 0.57F, where F is the focal length of the objective as a whole, characterized by the second component consisting of a biconvex element with refractive index less than 1.56 and dispersive index greater than 55 cemented to a biconcave element whose refractive index is at least 0.08 greater and whose dispersive index is at least 20 less than that of the biconvex element, and by the third component consisting of a positive element with a refractive index greater than 1.68 and a dispersive index greater than 45 cemented to a biconcave element having a refractive index at least 0.15 less than and a dispersive index smaller than that of the biconvex component.

5. An objective according to claim 4 in which the concave surface of the third component has a radius of curvature between 1.9 and 2.6 times that of the second component.

6. An objective according to claim 4 in which each positive component consists of a positive element with refractive index between 1.78 and 1.85 and dispersive index greater than 35.

7. An objective comprising four coaxial meniscus lens components separated by air of which the inner two are compound negative components highly concave toward each other and the outer components are positive and have their outermost surfaces convex with radii of curvature less than 2F where F is the focal length of the objective as a whole, characterized by the front inner component consisting of a biconvex element cemented to the front of a biconcave element of higher index, by the rear inner component consisting of a biconcavo element cemented to the front of a biconvex element of higher index, and by the rear positive component having a concave surface with a radius of curvature between one and two times that of its convex surface.

8. An objective comprising four coaxial components separated by air of which the two inner ones are compound negative menisci highly concave toward each other, the thickness of the rear inner component is less than 0.1F where F is the focal length of the objective, and the two outer components are positive menisci concave toward the inner components, characterized by the radius of curvature of the front surface of the front positive component being between 0.5F and 2.0F and by the radius of curvature of the concave surface of the rear component being between one and two times that of its convex surface.

9. An objective comprising four coaxial components separated by air wherein the two inner components are compound negative menisci concave toward each other, their concave surfaces having radii of curvature between 0.14F and 0.57F where F is the focal length of the objective as a whole, and wherein the two outer components are positive menisci concave toward the inner components, their convex surfaces having radii of curvature less than 2F and greater than the radii of the concave surfaces of the respective adjacent negative components, characterized by at least one outer component having a positive element with refractive index between 1.78 and 1.85 and dispersive index greater than 35.

10. An objective according to claim 9 in which each outer component consists entirely of a positive element with refractive index between 1.78 and 1.85 and dispersive index greater than 35.

11. An objective comprising four coaxial meniscus components separated by air in which the respective refractive indices N for the D line of the spectrum, the dispersive indices V, the radii of curvature R, the thicknesses $t$, and the spaces $s$, each numbered by subscripts from front to rear, are between the limits shown in the following table:

| | | | |
|---|---|---|---|
| $1.78 < N_1 < 1.85$ | $V_1 > 35$ | $+R_1 < +R_2$ | $t_1 < 0.08F$ |
| | | $\frac{F}{2} < +R_2 < 2F$ | $s_1 < 0.05F$ |
| $1.35 < N_2 < 1.55$ | $V_2 > 55$ | $+R_3 < +R_3 < +R_2$ | $t_2 < 0.10F$ |
| $N_3 > (N_2 + 0.08)$ | $V_3 < (V_2 - 20)$ | $\frac{F}{2} < -R_4 < \infty$ | $t_3 < t_2$ |
| | | $.14F < +R_5 < .22F$ | $0.05F < S_2 < 0.15F$ |
| $N_4 < (N_5 - 0.15)$ | $V_4 < V_5$ | $1.9R_5 < -R_6 < 2.6R_5$ | $t_4 < t_5$ |
| $N_5 > 1.68$ | $V_5 > 45$ | $\frac{F}{4} < +R_7 < \infty$ | $(t_4 + t_5) < 0.10F$ |
| | | $-R_8 < -R_8 < -R_9$ | $s_3 < 0.05F$ |
| $1.78 < N_6 < 1.85$ | $V_6 > 35$ | $-R_{10} < -R_9 < -2R_{10}$ | $t_6 < 0.10F$ |
| | | $\frac{F}{4} < -R_{10} < F$ | | where F is the focal length of the objective and where the + and − signs in the third column designate surfaces that are respectively convex and concave to the front.

12. An objective substantially according to the following specifications:

| Lens | N | V | Radii | Thicknesses |
|---|---|---|---|---|
| I | 1.8 | 42 | $R_1 = +0.3F$ | $t_1 = 0.03F$ |
| | | | $R_2 = +0.7F$ | $s_1 = 0.03F$ |
| II | 1.5 | 67 | $R_3 = +0.3F$ | $t_2 = 0.04F$ |
| III | 1.6 | 38 | $R_4 = -1.4F$ | $t_3 = 0.02F$ |
| | | | $R_5 = +0.2F$ | $s_2 = 0.08F$ |
| IV | 1.5 | 47 | $R_6 = -0.4F$ | $t_4 = 0.02F$ |
| V | 1.7 | 51 | $R_7 = +0.4F$ | $t_5 = 0.04F$ |
| | | | $R_8 = -0.6F$ | $s_3 = 0.01F$ |
| VI | 1.8 | 42 | $R_9 = -0.8F$ | $t_6 = 0.05F$ |
| | | | $R_{10} = -0.5F$ | | where the first column designates the lens elements by roman numerals in order from front to rear and where F is the focal length of the objective, N is the index of refraction for the D line of the spectrum, V is the dispersive index, R, $t$, and $s$ refer respectively to the radii of curvature of the refractive surfaces, the thicknesses of the elements, and the airspaces between the elements, the subscripts on these refer to the surfaces, the elements, and the spaces numbered consecutively from the front, and the + and − signs in the fourth column correspond to surfaces which are respectively convex and concave to the front.

13. An objective comprising four coaxial components separated by air of which the two outer ones are positive and have convex outer surfaces each with a radius of curvature smaller than 2F where F is the focal length of the objective as a whole and the two inner ones are compound negative menisci highly concave toward each other, the concave surface of each negative component having a radius of curvature greater than 0.14F and less than that of the outer surface of the respective adjacent positive component and the objective being characterized by the ratio $$\frac{P_1 + P_{10}}{P_2 + P_9}$$

having a value of algebraically between −2.2 and −1.0, where $P_1$ and $P_{10}$ are the dioptric powers of the outer surfaces of the outer components and $P_2$ and $P_9$ are the dioptric powers of the inner surfaces of the outer components.

GEORGE H. AKLIN.

REFERENCES CITED

The following references are of record in the file of this patent:

UNITED STATES PATENTS

| Number | Name | Date |
|---|---|---|
| 583,336 | Rudolph | May 25, 1897 |
| 1,786,916 | Merte | Dec. 30, 1930 |
| 2,117,252 | Lee | May 10, 1938 |
| 2,250,337 | Warmisham | July 22, 1941 |
| 2,289,779 | Herzberger | July 14, 1942 |
| 2,252,681 | Aklin | Aug. 19, 1941 |
| 2,343,627 | Aklin | Mar. 7, 1944 |